(12) United States Patent
Hou et al.

(10) Patent No.: US 8,456,323 B2
(45) Date of Patent: Jun. 4, 2013

(54) LIGHTING SYSTEM CONTROL METHOD

(75) Inventors: Sheng-Fa Hou, Taipei (TW); Tzu-Nan Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 627 days.

(21) Appl. No.: 12/742,141

(22) PCT Filed: Nov. 12, 2007

(86) PCT No.: PCT/CN2007/003200
§ 371 (c)(1),
(2), (4) Date: May 10, 2010

(87) PCT Pub. No.: WO2009/062334
PCT Pub. Date: May 22, 2009

(65) Prior Publication Data
US 2010/0265083 A1 Oct. 21, 2010

(51) Int. Cl.
*B60Q 1/00* (2006.01)
(52) U.S. Cl.
USPC ........... 340/903; 340/555; 340/556; 340/435; 340/541
(58) Field of Classification Search
USPC .................................. 340/903, 435; 701/301
See application file for complete search history.

(56) References Cited

U.S. PATENT DOCUMENTS

| 7,221,271 B2 | 5/2007 | Reime |
| 2008/0211908 A1* | 9/2008 | Dvir et al. ..................... 348/143 |

FOREIGN PATENT DOCUMENTS

| CN | 2267974 Y | 11/1997 |
| CN | 2383723 Y | 6/2000 |
| CN | 1346432 A | 4/2002 |
| CN | 1354338 A | 6/2002 |
| JP | 9263199 A | 10/1997 |

OTHER PUBLICATIONS

International Search Report and Written Opinion dated Aug. 11, 2008.

* cited by examiner

*Primary Examiner* — Brent Swarthout
(74) *Attorney, Agent, or Firm* — McClure, Qualey & Rodack, LLP

(57) ABSTRACT

A lighting-system control method applied to the lighting-system including a light source and an ultrasonic transmitting-and-receiving device is provided. The method comprises steps of: determining a distance between an object and the ultrasonic transmitting-and-receiving device by the ultrasonic transmitting-and-receiving device according to a flight time of an ultrasonic-wave; changing a first light property of the light source when the object is detected moving toward the ultrasonic transmitting-and-receiving device; and changing a second light property of the light source when the object is detected moving away from the ultrasonic transmitting-and-receiving device.

12 Claims, 7 Drawing Sheets

FIG.7A

|   | 1st | 2nd | 3rd | 4th | 5th | 6th | 7th | 8th | 9th | 10th | 11th | 12th |
|---|-----|-----|-----|-----|-----|-----|-----|-----|-----|------|------|------|
| R | 100 | 70  | 50  | 30  | 0   | 0   | 0   | 0   | 0   | 30   | 50   | 70   |
| G | 0   | 30  | 50  | 70  | 100 | 70  | 50  | 30  | 0   | 0    | 0    | 0    |
| B | 0   | 0   | 0   | 0   | 0   | 30  | 50  | 70  | 100 | 70   | 50   | 30   | unit %

FIG.7B

|              | 1st | 2nd | 3rd | 4th | 5th | 6th | 7th | 8th | 9th | 10th |
|--------------|-----|-----|-----|-----|-----|-----|-----|-----|-----|------|
| illumination | 100 | 90  | 80  | 70  | 60  | 50  | 40  | 30  | 20  | 10   | unit %

LIGHTING SYSTEM CONTROL METHOD

CROSS REFERENCE TO RELATED APPLICATION

This application is the 35 U.S.C. §371 national stage of PCT application PCT/CN2007/003200, filed Nov. 12, 2007, the disclosure of which is hereby incorporated by reference.

FIELD OF THE INVENTION

The present invention relates to a lighting-system control method, and more particularly to a lighting-system control method employing ultrasonic-waves.

BACKGROUND OF THE INVENTION

The light-emitting diode (LED) converts a forward current into light. In a forward-biased PN junction of the LED, minority carriers are injected across the junction and diffused into the P and N regions. The diffused minority carriers then recombine with the majority carriers. Such recombination gives rise to light emission.

LEDs are very popular elements. They can function as a light source for producing light in a variety colors and wavelengths. In an LED-lighting system, a light source includes a red LED, a green LED, and a blue LED, and a variety of colors can be produced by changing intensities of these LEDs. Conventionally, controlling the illuminations or colors of the light source is usually achieved through an operation interface, such as a button or a knob. Today, an infrared transmitting-and-receiving device is implemented in the lighting system for controlling the light source to output light with a specific illumination or color.

FIG. 1 is a diagram showing a conventional lighting system disclosed in a patent No. W2006/056814, where the lighting system adopts the infrared transmitting-and-receiving device for controlling the light source. As indicated, the lighting system 50 includes an infrared transmitting-and-receiving device 60 and a light unit 61. When an object 70, say, user's hand, enters a detectable zone of the infrared transmitting-and-receiving device 60, an infrared-wave 62, emitted from the infrared transmitting-and-receiving device 60, will be reflected by the object 70, and the reflected infrared-wave 63 is then received by a receiver 71 within the infrared transmitting-and-receiving device 60. According to the magnitude of the reflected infrared-wave 63 and the distance between the object 70 and the infrared transmitting-and-receiving device 60, the changes of the position of the object 70 related to the infrared transmitting-and-receiving device 60 is obtained. The lighting system 50 can control the light unit 61 to output light with a specific illumination or light color according to the changes of the position of the object 70.

However, adopting the infrared transmitting-and-receiving device 60 in the lighting system 50 results in some obvious defects. For example, the accuracy of the infrared transmitting-and-receiving device 60 is easily affected by the illumination around the infrared transmitting-and-receiving device 60. Moreover, the operation range of the infrared transmitting-and-receiving device 60 is limited to about 30 cm due to the magnitude decreasing of the reflected infrared-wave 63.

Instead of the infrared transmitting-and-receiving device, the ultrasonic transmitting-and-receiving device can be implemented in the lighting system. Using the ultrasonic transmitting-and-receiving device for determining the distance between an object and the ultrasonic transmitting-and-receiving device is a well-known technique. When an object enters a detectable zone of the ultrasonic transmitting-and-receiving device, an ultrasonic-wave, emitted from the ultrasonic transmitting-and-receiving device, will be reflected by the object, and the reflected ultrasonic-wave, called echo signal, is then received by the ultrasonic transmitting-and-receiving device. The period between the ultrasonic transmitting-and-receiving device emitting the ultrasonic-wave and the ultrasonic transmitting-and-receiving device receiving the echo signal is defined as TOF (time of flight). Obviously, the value of TOF is proportional to the distance between the object and the ultrasonic transmitting-and-receiving device.

FIG. 2 is a diagram showing the lighting system having an ultrasonic transmitting-and-receiving device for controlling the light source. As shown in FIG. 2, the lighting system includes: a light source 11 and an ultrasonic transmitting-and-receiving device 12. The light source 11 is LEDs, and further includes of a red LED (R), a green LED (G), and a blue LED (B). When an object 13 enters a detectable zone of the ultrasonic transmitting-and-receiving device 12, an ultrasonic-wave, emitted from the ultrasonic transmitting-and-receiving device 13, will be reflected by the object 13. The echo signal is then received by the ultrasonic transmitting-and-receiving device 12. According to the value of TOF, a microprocessor in the lighting system (not shown in FIG. 2) can determine the distance R between the object 13 and the ultrasonic transmitting-and-receiving device 12. The lighting system then generates a control signal according to the distance R for controlling the light source 11 to output light with specific light properties (such as color or light illumination). For example, the light source 11 of the lighting system can be designed to output light with a first color if the distance R between the object 13 and the ultrasonic transmitting-and-receiving device 12 is determined to be R1; the light source 11 outputs light with a second color if the distance R is R2; the light source 11 outputs light with a third color if the distance R is R3 and so on. Or, the light source 11 outputs light with a first illumination if the distance R is R1, a second illumination if the distance R is R2, a third illumination if the distance R is R3 and so on.

However, the above-mentioned lighting system cannot control more than one light property through the change of the distance R. In other words, the lighting system is only capable of changing either the light color or the light illumination. Moreover, due to the limit of the distance R between the object 13 and the ultrasonic transmitting-and-receiving device 12, the number of light with different light properties is accordingly limited.

SUMMARY OF THE INVENTION

The objective of the invention is for publishing a lighting-system control method utilizing ultrasonic waves to measure distances, so that the lighting system is capable of controlling both the light color and the light illumination, or other light characteristics, and the efficiency of the light system is enhance.

To achieve said objective, the present invention provides solutions as bellow.

The present invention discloses a lighting-system control method applied to the lighting-system including a light source and an ultrasonic transmitting-and-receiving device. The method comprises steps of: determining a distance between an object and the ultrasonic transmitting-and-receiving device according to a flight time of an ultrasonic-wave, wherein light properties of the light source can be changed if the distance is maintained in a specific range over a specific period; changing a first light property of the light source and keeping a second light property of the light source unchanged when the object is detected moving toward the ultrasonic transmitting-and-receiving device; and changing the second light property of the light source and keeping the first light property of the light source unchanged when the object is detected moving away from the ultrasonic transmitting-and-receiving device.

Moreover, the present invention provides lighting-system control method applied to the lighting-system including a light source and an ultrasonic transmitting-and-receiving device. The method comprises steps of: switching to a standby mode when the lighting system is turned on; determining a distance between an object and the ultrasonic transmitting-and-receiving device according to a flight time of an ultrasonic-wave; switching the lighting system from the standby mode to an enable mode if the distance is maintained in a specific range over a specific period; changing a first light property of the light source and keeping a second light property of the light source unchanged if the object is detected moving toward the ultrasonic transmitting-and-receiving device when the lighting system is operating in the enable mode; changing the second light property of the light source and keeping the first light property of the light source unchanged if the object is detected moving away from the ultrasonic transmitting-and-receiving device when the lighting system is operating in the enable mode; and switching the lighting system to the standby mode if the object is not detected.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 7A is a table showing twelve sets of light-property parameter, where each light-property parameter set includes three parameters standing for the power of the R, G, B LEDs; and FIG. 7B is a table showing ten sets of light-property parameter.

Figure 1:
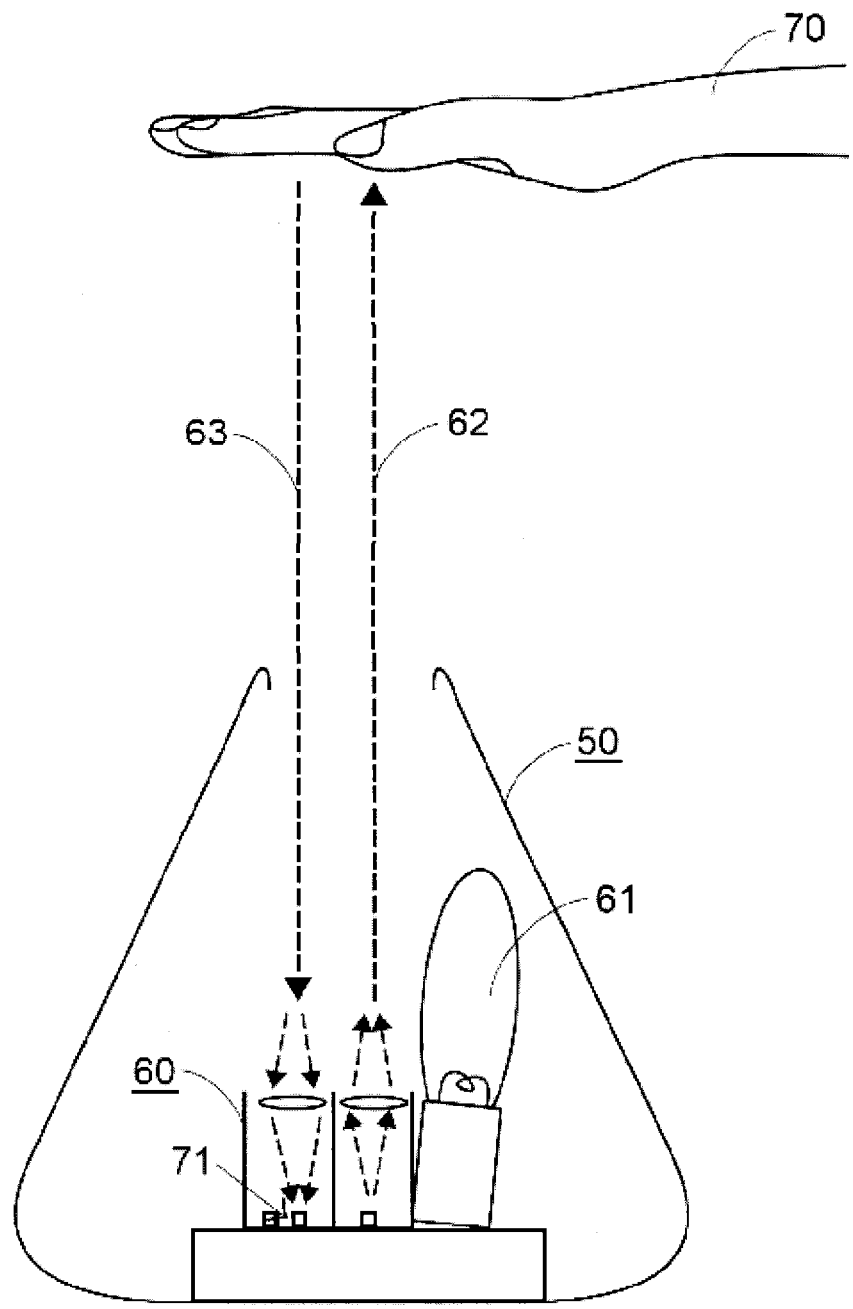
FIG. 1 is a diagram showing a conventional lighting system disclosed in the patent No. W2006/056814.
Figure 2:
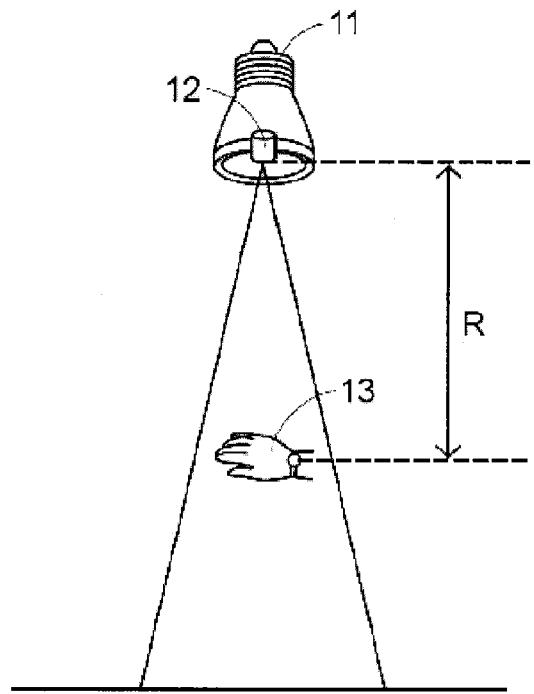
FIG. 2 is a diagram showing the lighting system having an ultrasonic transmitting-and-receiving device for controlling the light source.

Elements included in the figures of the invention are listed as follows:
Light source 11, 21
Ultrasonic transmitting-and-receiving device 12
Object 13, 23
Lighting system 50
Infrared transmitting-and-receiving device 60
Light unit 61
Infrared-wave 62
Reflected infrared-wave 63
Object 70
Receiver 71

DETAILED DESCRIPTION OF PREFERRED EMBODIMENTS

The present invention mainly employs ultrasonic-waves for determining a distance between an object (such as user's hand) and an ultrasonic transmitting-and-receiving device in an ultrasonic-wave sensing region, determining the moving direction of the object through logic or signal processing, and then changing the light properties (such as light color or light illumination) according to the moving direction of the object.

Figure 3:
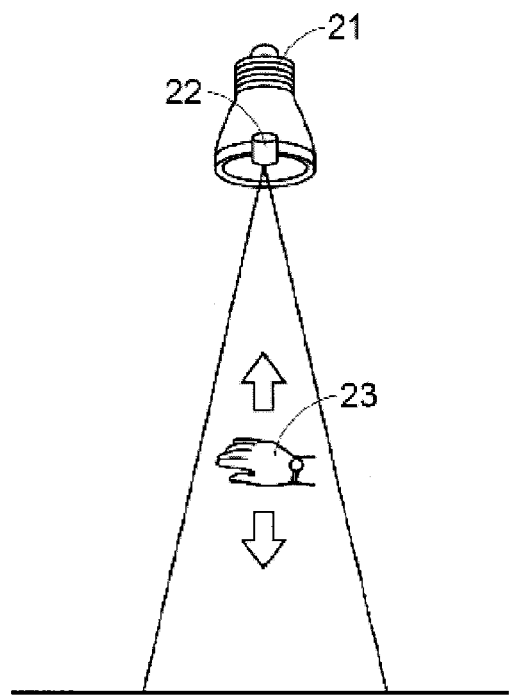
FIG. 3 is a diagram showing the lighting system of the present invention having the ultrasonic transmitting-and-receiving device for controlling the light source.

FIG. 3 is a diagram showing the lighting system of the present invention having the ultrasonic transmitting-and-receiving device for controlling the light source. As shown in FIG. 3, the lighting system includes: a light source 21 and an ultrasonic transmitting-and-receiving device 22. The light source 21 is LEDs, and further includes a red LED (R), a green LED (G), and a blue LED (B). The light source 21 and the ultrasonic transmitting-and-receiving device 22 can together combined to a lighting-system module. In the lighting-system module, the ultrasonic transmitting-and-receiving device 22 serves to output ultrasonic-waves, and receive ultrasonic-waves reflected from the object. Or, the ultrasonic transmitting-and-receiving device 22 can be divided to two components, one for outputting the ultrasonic-waves, and the other for receiving the reflected ultrasonic-waves from the object.

When the lighting system is turned on, the lighting system enters a standby mode. In the standby mode, the light properties of the light system, such as light color or light illumination, are maintained in the previous states of the last time when the user turned off the lighting system.

When user plans to change the light properties, the lighting system must first enter an enable mode. User can control the lighting system to switch to the enable mode by moving an object 23 to a detectable zone of the ultrasonic transmitting-and-receiving device 22, and keeping the objects 23 at a same position over a specific period (such as one second). Obviously, switching the lighting system to the enable mode can be achieved by using devices of a remote controller or a switch fixed on a wall.

In the enable mode, the lighting system can change the light properties (such as light color or light illumination) according to the moving direction of the object 23 in the detectable zone. As shown in FIG. 3, the lighting system will change the first light property (such as light color) if the object 23 is detected to move toward the ultrasonic transmitting-and-receiving device 22. The change of the light color can be cyclically or randomly. In other words, if user plans to change the first light property, user moves the object 23 toward the ultrasonic transmitting-and-receiving device 22; it follows that the first light property changes cyclically or randomly. Specifically, once the object 23 is detected moving toward the ultrasonic transmitting-and-receiving device 22, the lighting system will keep changing the first light property cyclically or randomly. When the light color is changed to user's desire, then user can move the object 23 out of the detectable zone or move the object 23 in different directions. Accordingly the lighting system stops changing the first light property, and the first light property (ex. light color) is then maintained at the desired state.

Similarly, as indicated in FIG. 3, the lighting system will change the second light property (such as light illumination) if the object 23 is detected to move away from the ultrasonic transmitting-and-receiving device 22. The change of the light illumination can also be cyclically or randomly. In other words, if user plans to change the second light property, user moves the object 23 away from the ultrasonic transmitting-and-receiving device 22; it follows that the second light property changes cyclically or randomly. Specifically, once the object 23 is detected moving away from the ultrasonic transmitting-and-receiving device 22, the lighting system will keep changing the second light property cyclically or randomly. When the light illumination is changed to user's desire, then user can move the object 23 out of the detectable zone or move the object 23 in different directions. Accordingly the lighting system stops changing the second light property, and the second light property (ex. light illumination) is then maintained at the desired state.

Figure 4:
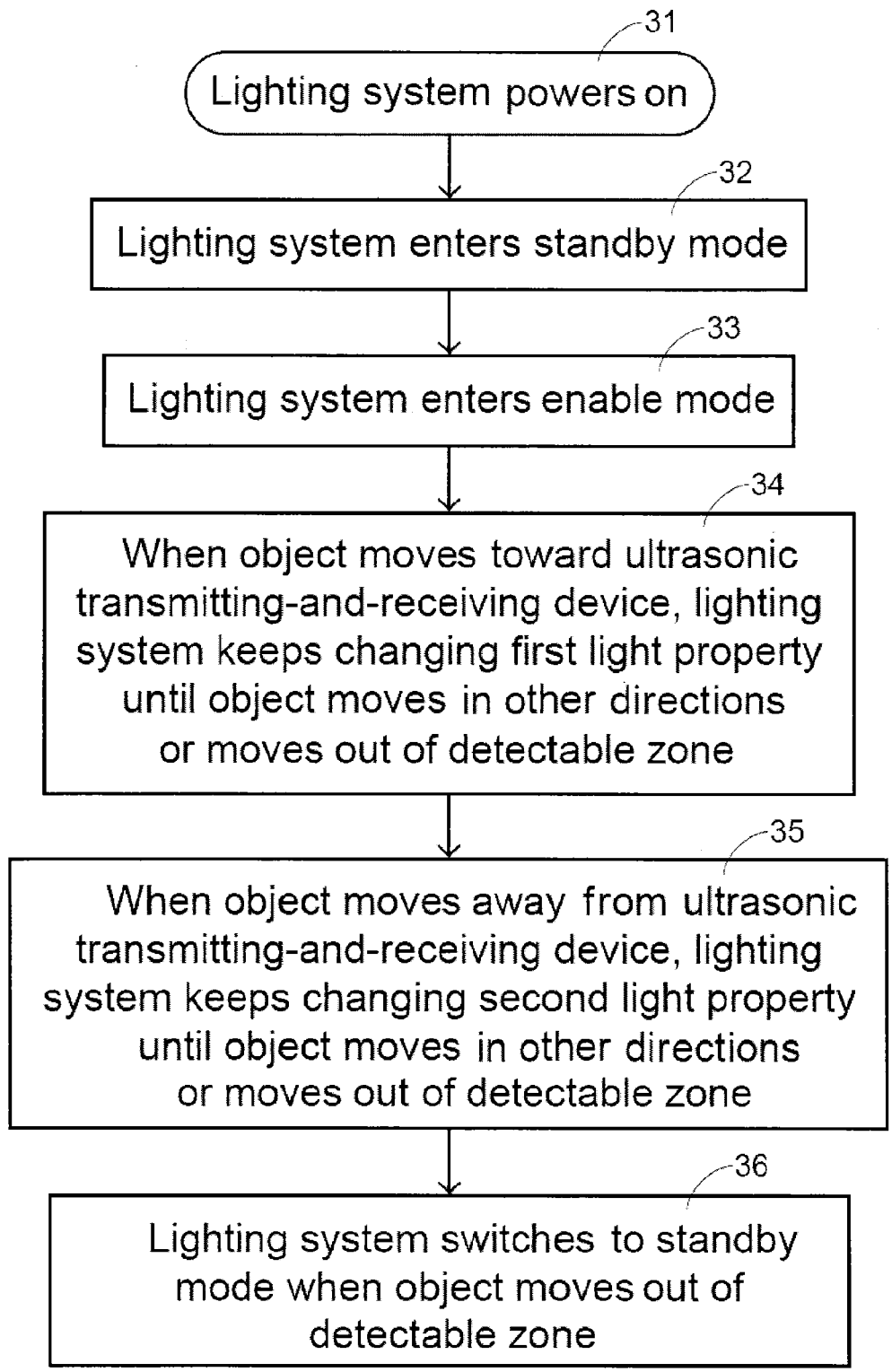
FIG. 4 is a flow chart showing the process of the lighting system of the present invention changing the first and second light properties.

FIG. 4 is a flow chart showing the process of the lighting system changing the first and second light properties. As indicated, first the lighting system is powered on (step 31); the lighting system then enters the standby mode (step 32). In the standby mode, the first and second light properties are maintained in the previous states. When user moves the object 23 into the detectable zone of the ultrasonic transmitting-and-receiving device 22, and keeps the object 23 at the same position over a specific period (such as one second), the lighting system switches to the enable mode (step 33). In the enable mode, the lighting system cyclically or randomly changes the first light property (such as light color) if the object 23 is detected moving toward the ultrasonic transmitting-and-receiving device 22, and the lighting system stops changing the first light property and maintains the first light property (such as light color) if the object 23 is detected moving out of the detectable zone or moving in other directions (step 34). The lighting system cyclically changes the second light property (such as light illumination) if the object 23 is detected moving away from the ultrasonic transmitting-and-receiving device 22, and the lighting system stops changing the second light property (such as light illumination) and maintains the second light property if the object 23 is detected moving out of the detectable zone or moving in other directions (step 35). After the object 23 is detected moving out of the detectable zone by the ultrasonic transmitting-and-receiving device 22, the lighting system is switched to the standby mode (step 36).

Figure 5A:
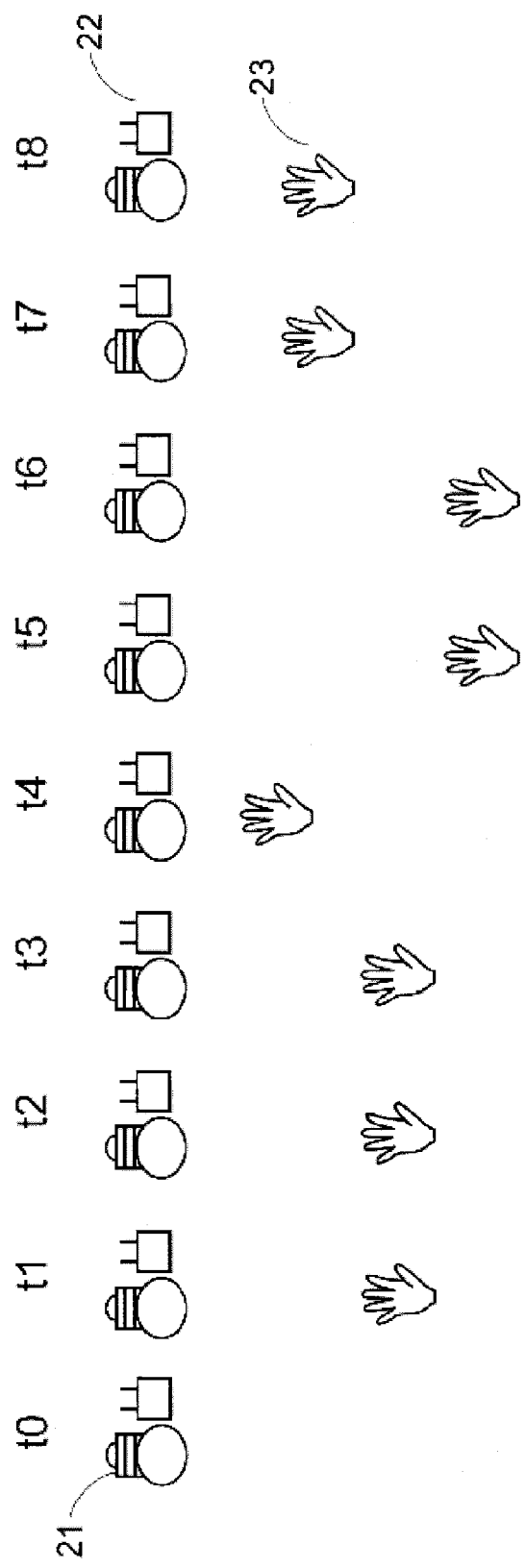
FIG. 5A is a diagram showing the positions of the object related to the ultrasonic transmitting-and-receiving device during the process of the lighting system controlling light properties.

Following is an example for specifically illustrating the lighting system of the present invention changing the light properties from the user's view and the lighting system's view. FIG. 5A is a diagram showing the positions of the object 23 related to the ultrasonic transmitting-and-receiving device 22 during the process of the lighting system controlling light properties. In the illustrated example, the lighting system is assumed to switch to the enable mode if the object 23 is detected in the detectable zone and maintained at a same position over one second. The lighting system is assumed to cyclically change the light color if the object 23 is detected moving toward the ultrasonic transmitting-and-receiving device 22; and the lighting system is assumed to cyclically change the light illumination if the object 23 is detected moving away from the ultrasonic transmitting-and-receiving device 22.

First, at time point t0, the lighting system is operating in the standby mode when the lighting system is turned on and the light properties are maintained in the previous states (for example, light color is white and light illumination is extremely strong). At time point t1, user plans to change the light properties and then user moves the object 23 (such as user's hand) to the detectable zone and keeps the object 23 at the same position until time point t2. The period between time points t1 and t2 is, for example, one second. In this way, the lighting system is switched to the enable mode at time point t2. During the period between time point t2 and t3, the object 23 maintains at the same position and the light properties do not change. During the period between time point t3 and time point t4, user determines to change the first light property (ex. light color) first, and user starts to move the object 23 toward the ultrasonic transmitting-and-receiving device 22. In this way, lighting system is cyclically changing the light color. Until time point t4, the light color is changed to user's desire (for example, the light color is pink) and user turns to change the second light property (ex. light illumination), and then user starts to move the object 23 away from the ultrasonic transmitting-and-receiving device 22 (at time point t4, light color is pink and light illumination is radiant). Between time point t4 and time point t5, user keeps moving the object 23 away from the ultrasonic transmitting-and-receiving device 22, and the lighting system is cyclically changing the light illumination as preset. Between time point t5 and time point t6, because user does not decide the needed light illumination, user is still keeping the object 23 at the same position and the light illumination is still changing. It is noted that, between time point t5 and time point t6, user does not move the object 23 out of the detectable zone or toward another direction, the lighting system is cyclically changing the light illumination as preset. At time point t6, the light illumination is changed to user's desire (for example, the light illumination is dim). However, user desires to change the light color from pink to other color at the time, so user starts to move the object 23 toward the ultrasonic transmitting-and-receiving device 22 (at the time, light color is pink and light illumination is dim). During the period between time point t6 and time point t7, user keeps moving the object 23 toward the ultrasonic transmitting-and-receiving device 22. In this way, the lighting system is cyclically changing the light color as preset. Between time point t7 and time point t8, because user does not decide the needed light color, user is still keeping the object 23 at the same position and the light color is still changing. It is noted that, between time point t7 and time point t8, user does not move the object 23 out of the detectable zone or toward another direction, the lighting system is cyclically changing the light color as preset. At time point t8, the light color is changed to user's desire (for example, light color is blue). When both the light color and light illumination are changed to user's desire (at time point t8, light color is blue and light illumination is dim), and then user starts to move the object 23 out of the detectable zone and accordingly the lighting system is switched to the standby mode.

Figure 5B:
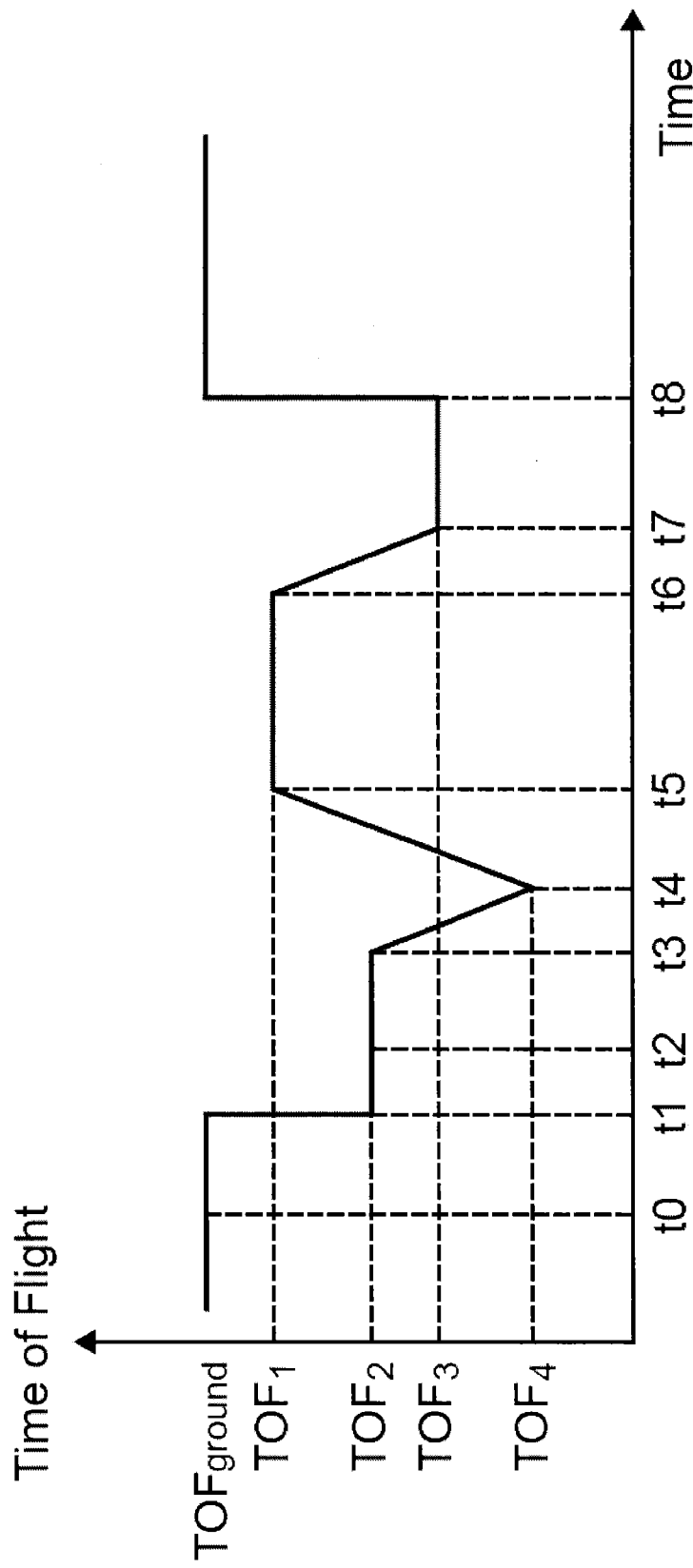
FIG. 5B is a diagram showing the changes of the TOF during the process of the lighting system controlling light properties.

The above-mention example is illustrated again from the lighting system's view. FIG. 5B is a diagram showing the changes of the TOF during the process of the lighting system controlling light properties in the illustrated example. First, before time point t1, because the TOF is $TOF_{ground}$, which refers nothing but the ground is detected by the ultrasonic transmitting-and-receiving device 22 in the detectable zone, the lighting system is operating in the standby mode and the light properties are maintained in the previous states (for example, light color is white and light illumination is extremely strong). At time point t1, the TOF decreases to $TOF_2$ and the $TOF_2$ is maintained until time point t2. The period between time point t1 and time point t2 maybe one second, and the lighting system is switched to the control mode at time point t2. During time point t2 and time point t3, the TOP is kept at $TOF_2$, representing that the object 23 does not move, thus the light properties being maintained in the previous states (for example, light color is white and light illumination is extremely strong). During time point t3 and time point t4, the TOF decreases from $TOF_2$ to $TOF_4$, referring that the object 23 (such as user's hand) is moving toward the ultrasonic transmitting-and-receiving device 22. The lighting system then cyclically changes the light color. At time point t4, the TOF measured by the ultrasonic transmitting-and-receiving device 22 is no more decreased and then increased, referring that the object 23 is moving away from the ultrasonic transmitting-and-receiving device 22, and the lighting system then stops changing the light color and maintains the light color (for example, light color is pink and light illumination is extremely strong) at time point t4.

During the period of time point t4 and time point t5, the TOF increases from $TOF_4$ to $TOF_1$, referring that the object 23 is moving away from the ultrasonic transmitting-and-receiving device 22. The lighting system then cyclically changes the light illumination as preset during the period of time point t4 and time point t5. At time point t6 to t7, the TOF is decreased, which refers that the object 23 is moving toward the ultrasonic transmitting-and-receiving device 22, the lighting system then stops changing the light illumination (for example, at time point t6, light color is pink and light illumination is dim). During the period of time point t6 and time point t7, the TOF decreases from $TOF_1$ to $TOF_3$, referring that the object 23 is moving toward the ultrasonic transmitting-and-receiving device 22. The lighting system then cyclically changes the light color during the period of time point t6 and time point t7. During the period of time point t7 and time point t8, the TOF measured by the ultrasonic transmitting-and-receiving device 22 is fixed at $TOF_3$. Because the TOF does not increase (the object 23 does not move), and the ultrasonic transmitting-and-receiving device 22 does not detect the object 23 moving out of the detectable zone (the TOF is not $TOF_{ground}$), the lighting system then cyclically changes the light color as preset. After time point t8, the TOF is increasing to $TOF_{ground}$, which refers the object 23 is moving out of the detectable zone. The lighting system then stops changing the light color (for example, at time point t8, light color is blue and light illumination is dim). Finally, the lighting system switches from the enable mode to the standby mode.

Figure 6:
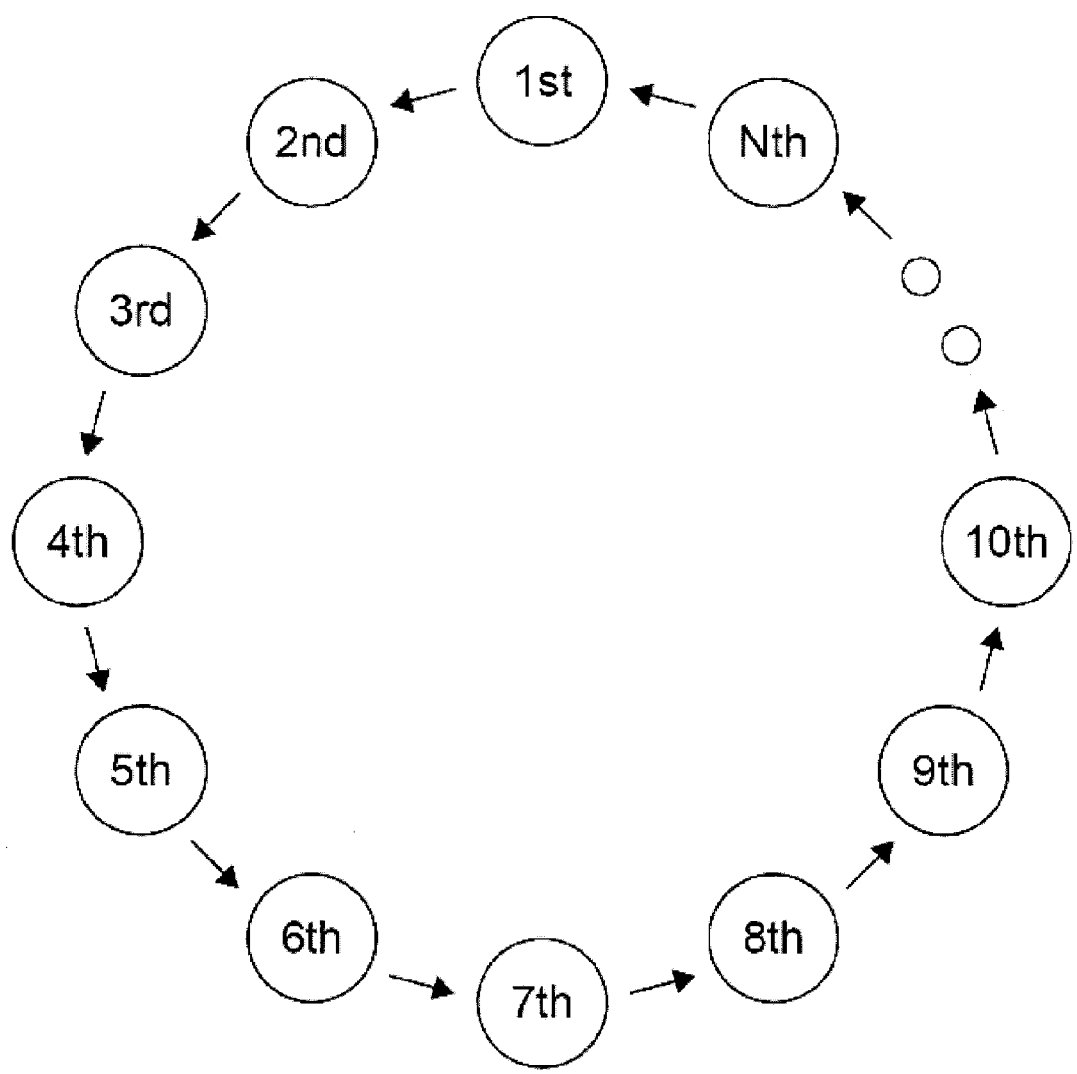
FIG. 6 is a diagram showing an order of a plurality of light-property parameter sets for changing the light properties in the lighting system.

The lighting system can cyclically change the light properties (for example, light color or light illumination) according to a plurality of light-property parameter sets. FIG. 6 is a diagram showing an order of a plurality of light-property parameter sets for changing the light properties in the lighting system. As indicated, there are N sets of light-property parameter and each light-property parameter set stands for a specific light property. If a light-property parameter set, say, the 5th set, is represented the light property at this moment, then the lighting system will start to change the light property according to the order of 5th->6th->7th->8th->9th->10th-> . . . ->Nth->1st->2nd->3rd->4th->5th->6th-> . . . .

Specifically, if the light source of the lighting system includes RGB LEDs and the light-property parameter set stands for the power of the RGB LEDs, the lighting system can output a specific color through a corresponding light-property parameter set. FIG. 7A is a table showing twelve sets of light-property parameter and each light-property parameter set includes three parameters standing for the power of the R, G, B LEDs, respectively. For example, the 1st light-property parameter set represents the R LED having a 100% output power; the G LED having a 0% output power; and the R LED having a 0% output power. In other words, the lighting system will output light with 100% red color when the 1st light-property parameter set is provided to the light source.

Specifically, if the light-property parameter set stands for the energy of light outputted from the light source, the lighting system could output light with a specific illumination through a corresponding light-property parameter set. FIG. 7B is a table showing ten sets of light-property parameter, where each light-property parameter set stands for the energy of the output light. For example, the 1st light-property parameter set represents the energy of output light is 100%. In other words, the lighting system will output light with a full illumination when the 1st light-property parameter set is provided to the light source.

It is understood that the light properties are not limited to the light color and light illumination in the present invention. Other light properties, such as light temperature, light glittering, light position, light zone, and even the switch of the lighting system, can be controlled through the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lighting-system control method, applied to the lighting-system including a light source and an ultrasonic transmitting-and-receiving device, the lighting-system control method being characterized by comprising steps of:
   determining a distance between an object and the ultrasonic transmitting-and-receiving device by the ultrasonic transmitting-and-receiving device according to a flight time of an ultrasonic-wave; and
   changing the light property of the light source when the distance is maintained in a specific range over a specific period, comprising:
      changing a first light property of the light source and maintained a second light property of light source unchanged when the object is detected moving toward the ultrasonic transmitting-and-receiving device; and
      changing the second light property of the light source and maintained the first light property of light source unchanged when the object is detected moving away from the ultrasonic transmitting-and-receiving device.

2. The lighting-system control method according to claim 1, characterized in that the first light property is the light color and the second light property is the light illumination; or, the first light property is the light illumination and the second light property is the light color.

3. The lighting-system control method according to claim 1, characterized in that the light source is an LED.

4. The lighting-system control method according to claim 1, characterized in that the light source at least includes a red LED, a green LED, and a blue LED.

5. The lighting-system control method according to claim 2, characterized in that changing the light color further comprises steps of:
   providing a plurality of color parameter sets, wherein the light source can output light with a corresponding color when receiving a specific color parameter set; and outputting the plurality of color parameter sets with a specific period and a specific order to the light source.

6. The lighting-system control method according to claim 2, characterized in that changing the light illumination further comprises steps of:
providing a plurality of illumination parameter sets, wherein the light source can output light with a corresponding illumination when receiving a specific illumination parameter set; and
outputting the plurality of illumination parameter sets with a specific period and a specific order to the light source.

7. A lighting-system control method, applied to the lighting-system including a light source and an ultrasonic transmitting-and-receiving device, the lighting-system control method being characterized by comprising steps of:
switching to a standby mode when the lighting system is turned on;
determining a distance between an object and the ultrasonic transmitting-and-receiving device by utilizing the ultrasonic transmitting-and-receiving device in the standby mode, switching the lighting system from the standby mode to an enable mode if the distance is maintained in a specific range over a specific period, otherwise, keeping the lighting system in the standby mode;
changing a first light property of the light source and maintained a second light property of light source unchanged if the object is detected moving toward the ultrasonic transmitting-and-receiving device when the lighting system is operating in the enable mode;
changing the second light property of the light source and maintained the first light property of light source unchanged if the object is detected moving away from the ultrasonic transmitting-and-receiving device when the lighting system is operating in the enable mode; and
switching the lighting system to the standby mode if the object is not detected.

8. The lighting-system control method according to claim 7, characterized in that the first light property is the light color and the second light property is the light illumination; or, the first light property is the light illumination and the second light property is the light color.

9. The lighting-system control method according to claim 7, characterized in that the light source is an LED.

10. The lighting-system control method according to claim 7, characterized in that the light source at least consists of a red LED, a green LED, and a blue LED.

11. The lighting-system control method according to claim 8, characterized in that changing the light color further comprises steps of:
providing a plurality of color parameter sets, wherein the light source can output light with a corresponding color when receiving a specific color parameter set; and
outputting the plurality of color parameter sets with a specific period and a specific order to the light source.

12. The lighting-system control method according to claim 8, characterized in that changing the light illumination further comprises steps of:
providing a plurality of illumination parameter sets, wherein the light source can output light with a corresponding illumination when receiving a specific illumination parameter set; and
outputting the plurality of illumination parameter sets with a specific period and a specific order to the light source.

* * * * *